June 7, 1932.  A. GRAENZ  1,862,514
METHOD AND MECHANISM FOR MAKING KNITTED FABRIC
Filed April 11, 1932   12 Sheets-Sheet 1
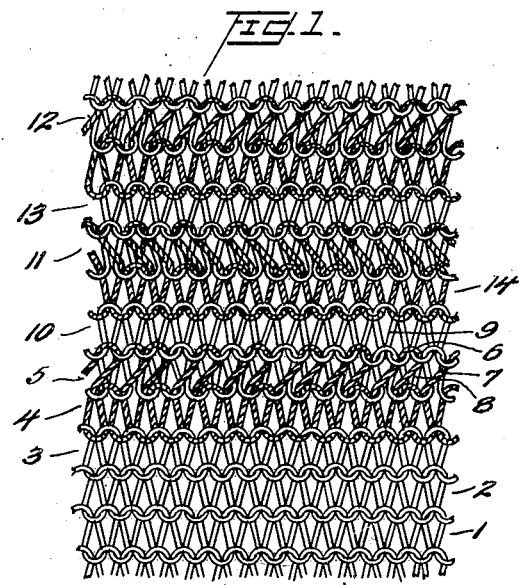
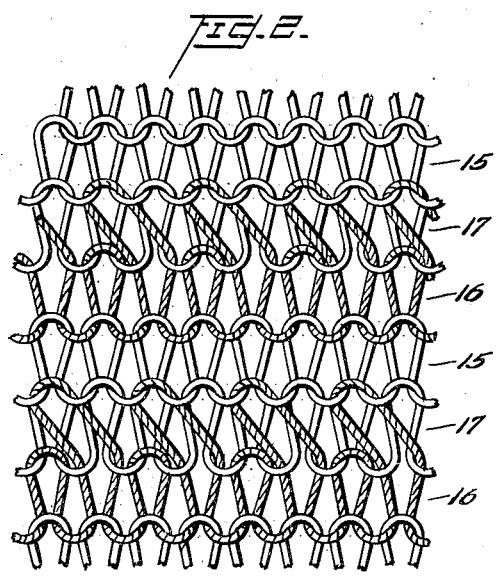
Inventor
Alfred Graenz
By Gifford, Scull & Burgess
Attorneys.

June 7, 1932.  A. GRAENZ  1,862,514
METHOD AND MECHANISM FOR MAKING KNITTED FABRIC
Filed April 11, 1932   12 Sheets-Sheet 2
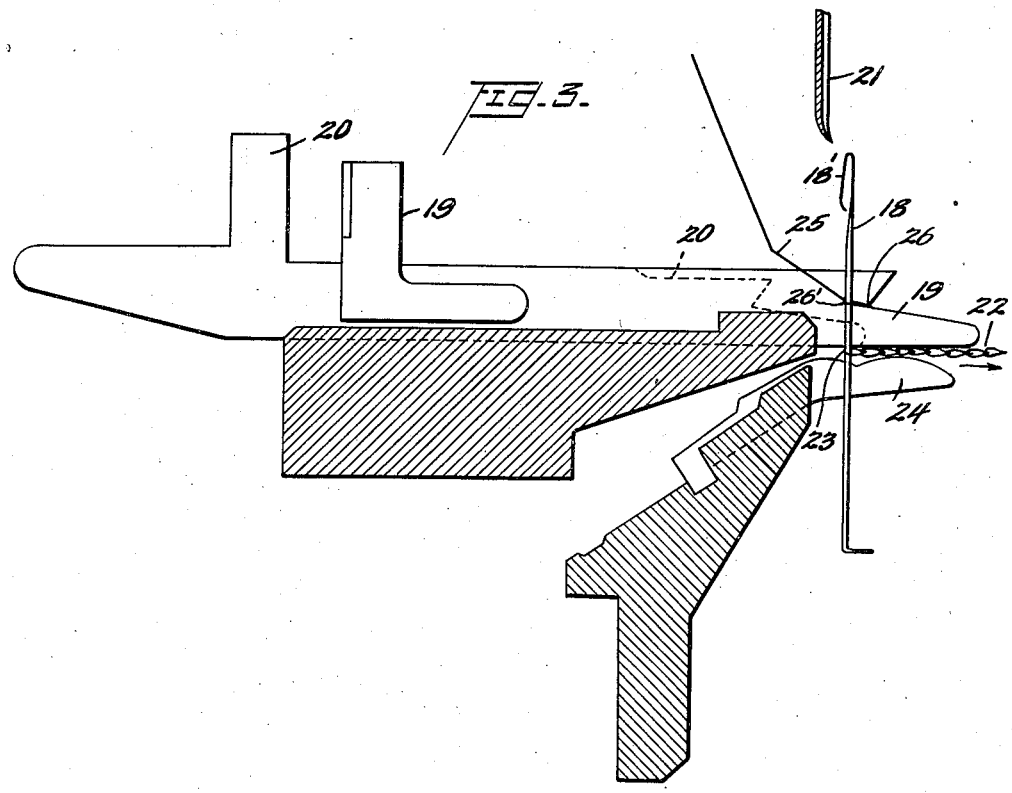
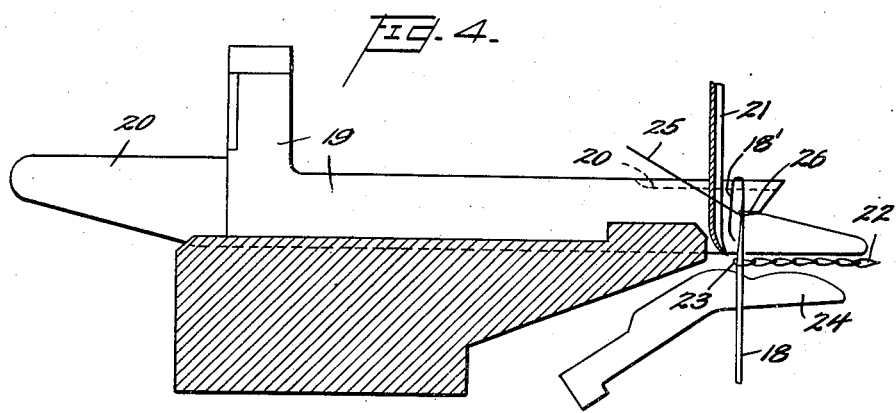

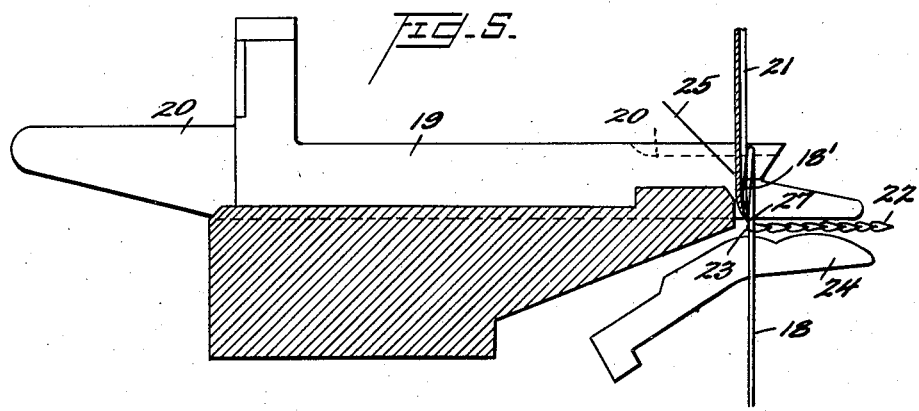
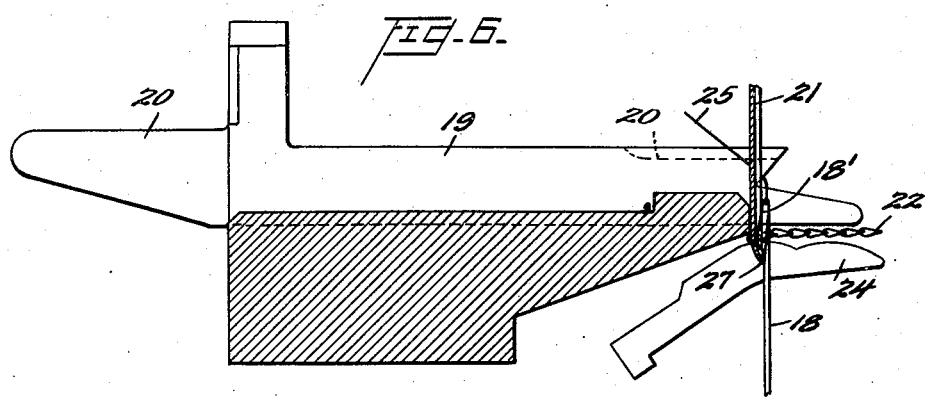
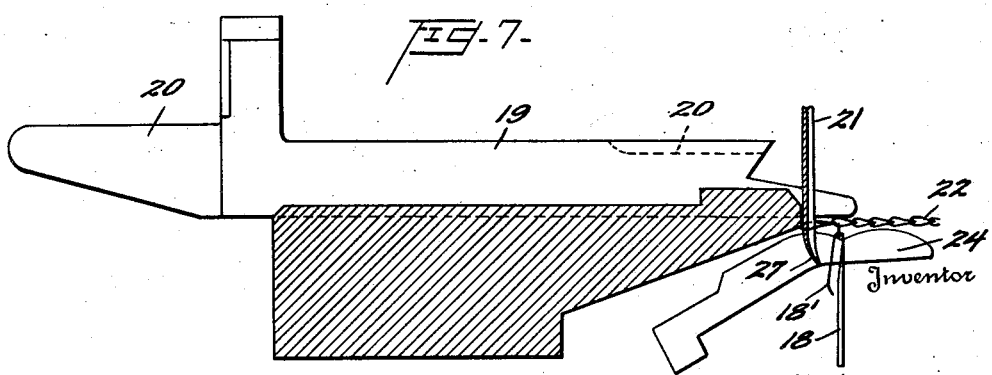

June 7, 1932.  A. GRAENZ  1,862,514
METHOD AND MECHANISM FOR MAKING KNITTED FABRIC
Filed April 11, 1932  12 Sheets-Sheet 4
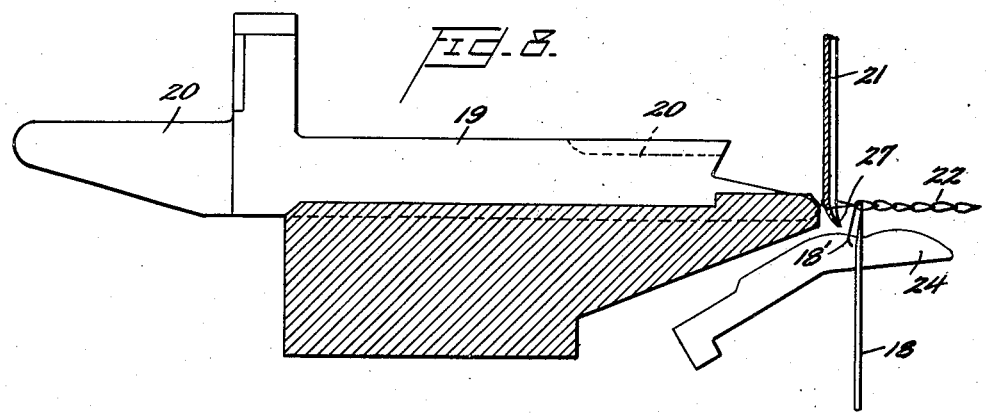
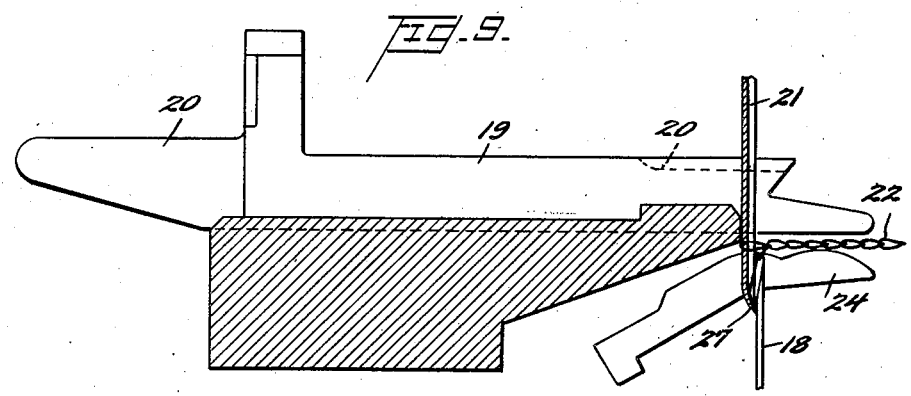
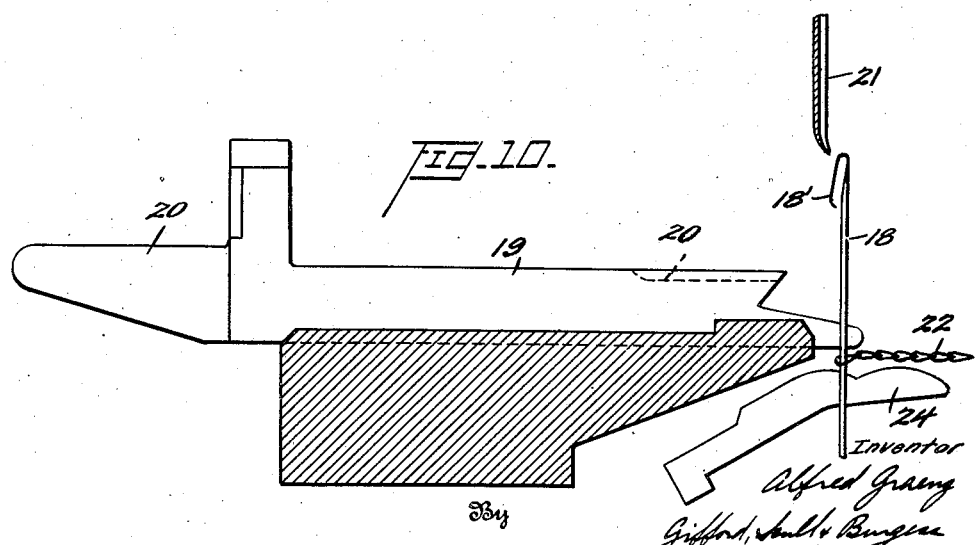

June 7, 1932.  A. GRAENZ  1,862,514
METHOD AND MECHANISM FOR MAKING KNITTED FABRIC
Filed April 11, 1932  12 Sheets-Sheet 5
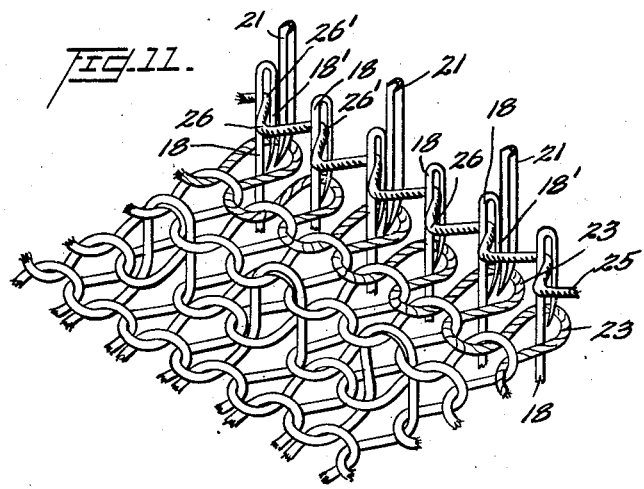
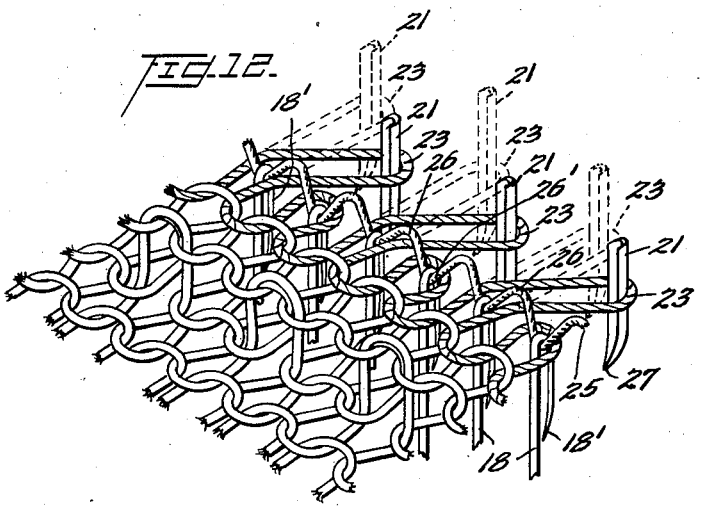

June 7, 1932.  A. GRAENZ  1,862,514
METHOD AND MECHANISM FOR MAKING KNITTED FABRIC
Filed April 11, 1932  12 Sheets-Sheet 6
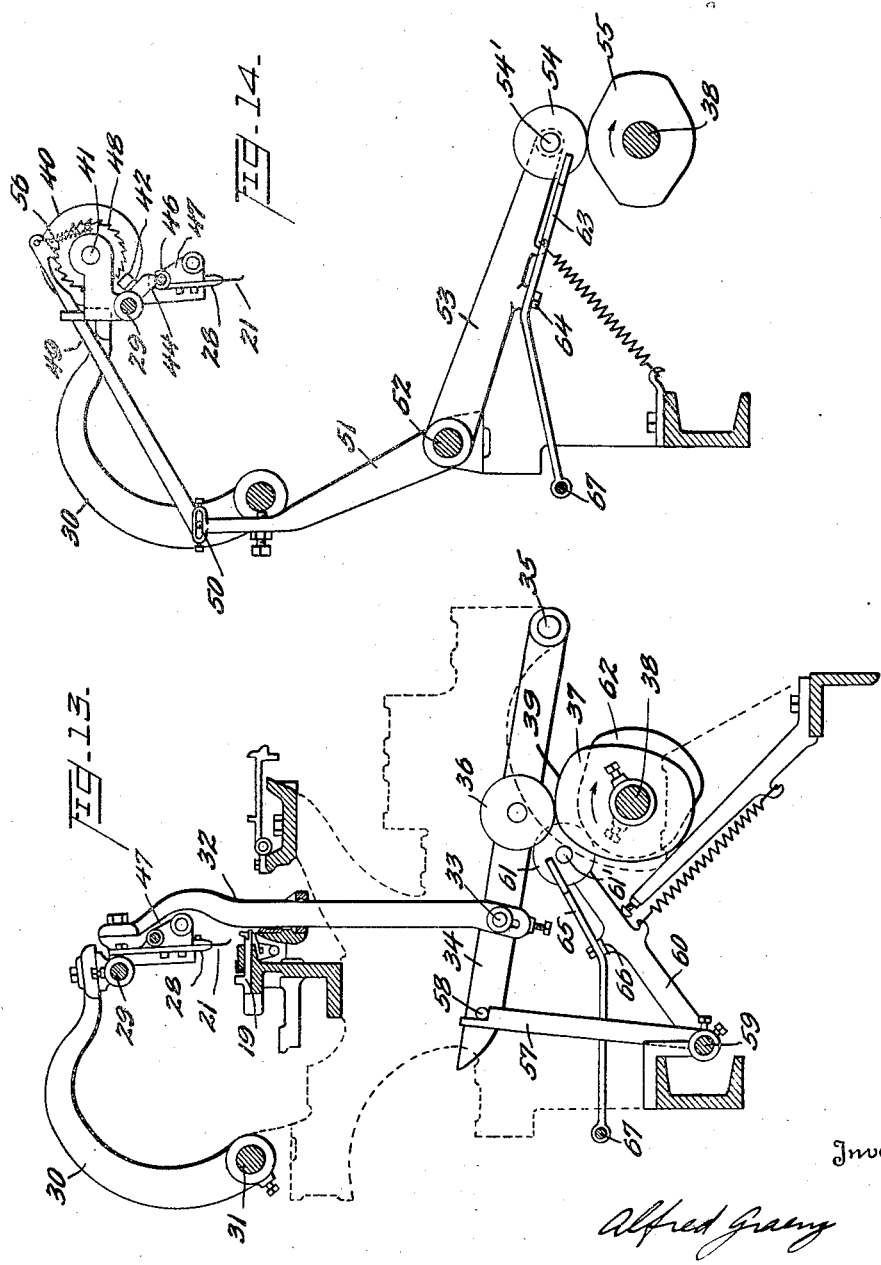
Inventor
Alfred Graenz
By Gifford, Scull & Burgess
Attorneys

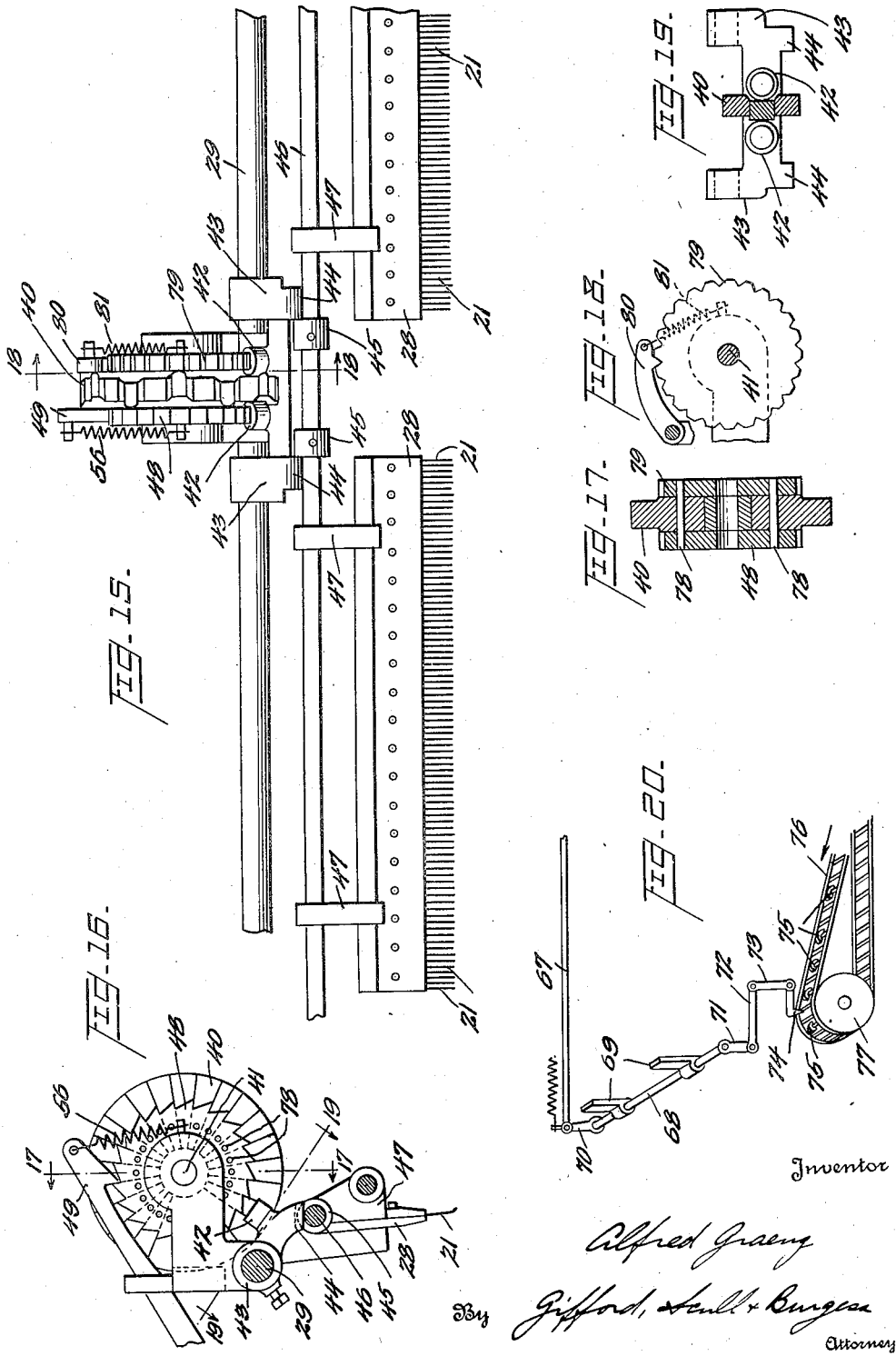

June 7, 1932.  A. GRAENZ  1,862,514
METHOD AND MECHANISM FOR MAKING KNITTED FABRIC
Filed April 11, 1932  12 Sheets-Sheet 8

Inventor
Alfred Graenz
By Gifford, Scull & Burgess
Attorneys

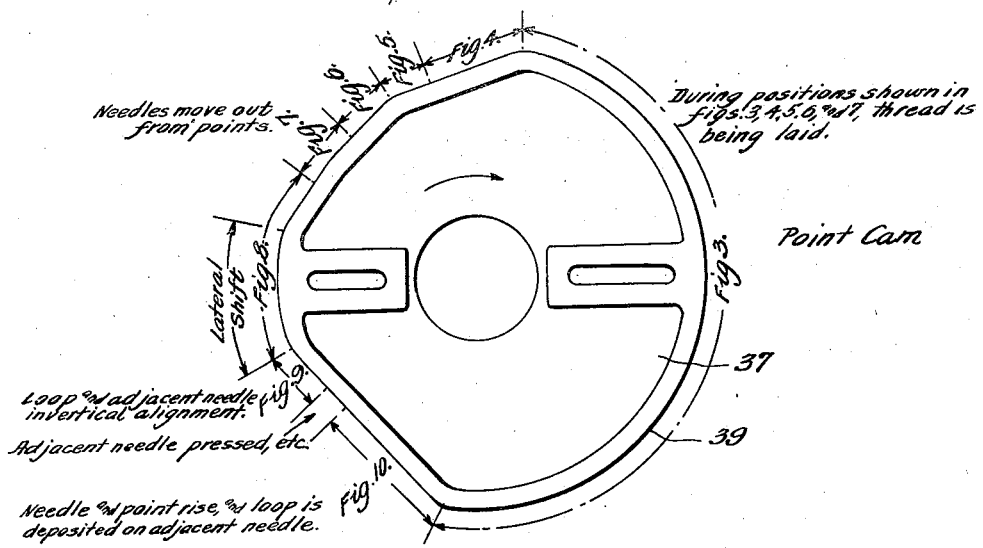
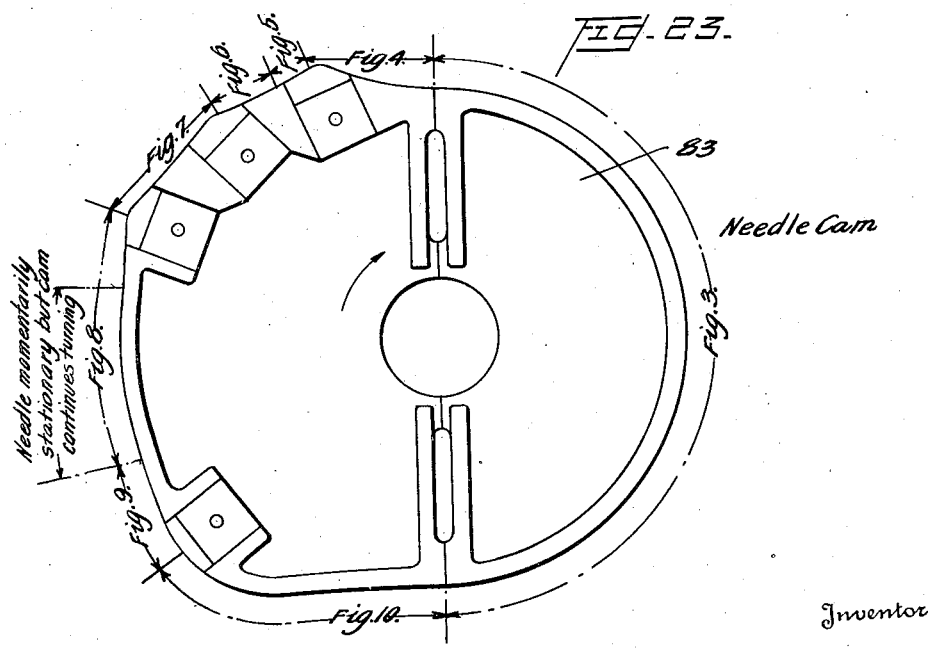

Fig. 24.
Needle Movement

Fig. 25.
Point Movement
End View

Fig. 26.
Point Movement
Front View

Inventor
Alfred Graenz
By Gifford, Scull & Burgun
Attorneys

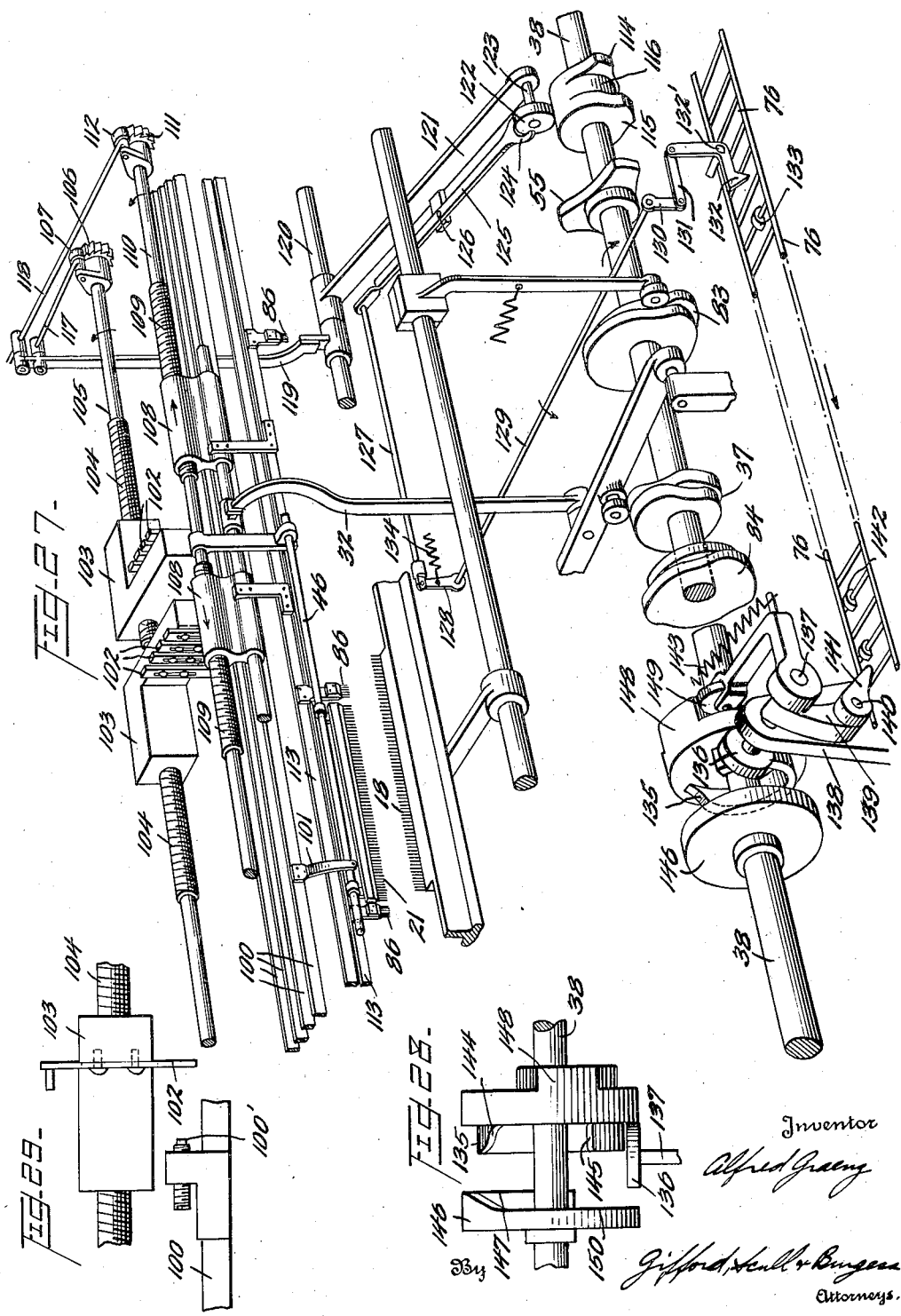

June 7, 1932.  A. GRAENZ  1,862,514
METHOD AND MECHANISM FOR MAKING KNITTED FABRIC
Filed April 11, 1932  12 Sheets-Sheet 12
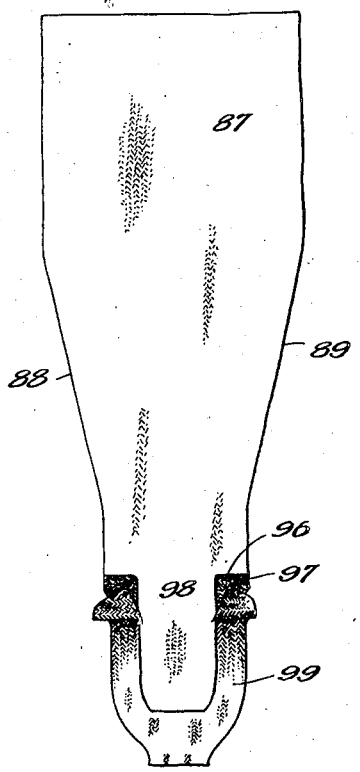
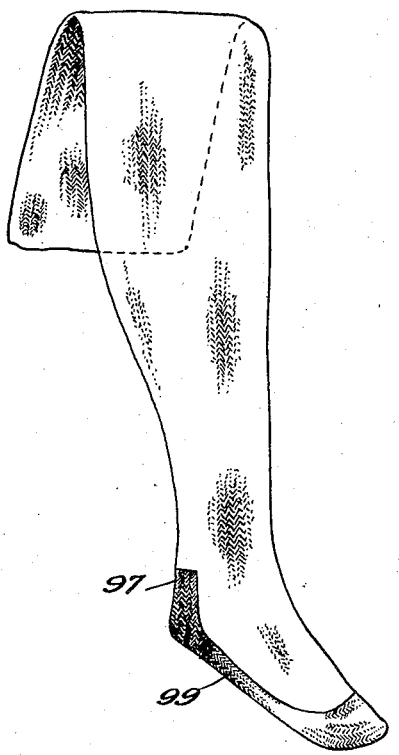
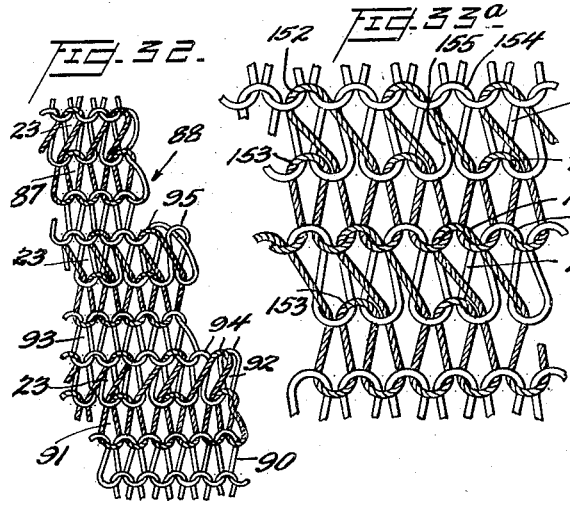
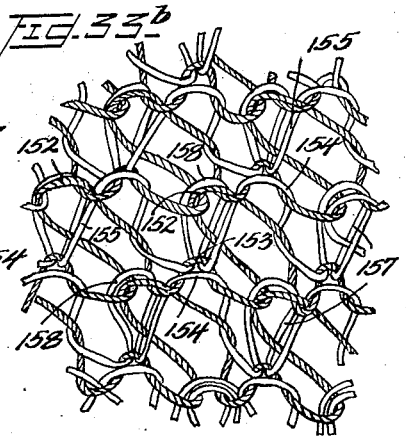

Patented June 7, 1932

1,862,514

UNITED STATES PATENT OFFICE

ALFRED GRAENZ, OF PHILADELPHIA, PENNSYLVANIA, ASSIGNOR TO NON-RUN FABRIC AND MACHINE CO., INC., OF NEW YORK, N. Y., A CORPORATION OF NEW YORK

METHOD AND MECHANISM FOR MAKING KNITTED FABRIC

Application filed April 11, 1932. Serial No. 604,474.

This invention relates to a novel and improved method for making a knitted fabric, together with a mechanism which may be used in the practice of the method, more particularly in connection with knitting hosiery.

This application is a continuation in part of divisible subject matter contained in my copending application, Serial No. 567,555, filed October 8, 1931, Patent No. 1,856,053 with the addition of certain parts of mechanism not illustrated in said copending application.

The novel features of the invention will be best understood from the following description and the annexed drawings, in which I have illustrated a selected embodiment of a mechanism which may be used in the practice of the invention and examples of the novel fabric resulting therefrom.

Referring to the drawings, Fig. 1 is a view on an exaggerated scale showing one form of stitch which may be used in making the fabric.

Fig. 2 is a view similar to Fig. 1, but showing a different arrangement of stitches which may be employed.

Figs. 3 to 10, inclusive, are diagrammatic views in the form of sections through the sinker head and associated mechanism and showing successive steps in the practice of one method which may be used in making a fabric similar to what is shown in Figs. 1 and 2, Fig. 7 being taken upon a section line through the wale of loops adjoining the wale through which the preceding Figs. 3 to 6 are taken.

Figs. 11 and 12 are diagrammatic views in perspective showing the relation of the different loops of the fabric to each other during the formation of certain stitches.

Fig. 13 is a vertical transverse section through one form of knitting machine illustrating one method of giving one of the necessary movements performed in practicing the invention.

Fig. 14 is a view similar to Fig. 13, but taken on a different plane parallel to that of Fig. 13 and illustrating one form of mechanism which may be used in giving another movement which cooperates with the movement caused by the mechanism of Fig. 13.

Fig. 15 is a view on an enlarged scale and taken from the right of Fig. 14, showing the mechanism appearing in the upper part of that figure.

Fig. 16 is a view on an enlarged scale taken on the same plane as that of Fig. 14 and showing certain parts appearing in that figure.

Fig. 17 is a section on the line 17—17 of Fig. 16.

Fig. 18 is a section on the line 18—18 of Fig. 15.

Fig. 19 is a section on the line 19—19 of Fig. 16.

Fig. 20 is a diagrammatic view showing the control means for some of the mechanism illustrated in the other figures.

Fig. 22 is a diagram of the cam 37 drawn on an enlarged scale.

Fig. 23 is a diagram of one of the cams for causing the needle movement.

Figure 21:
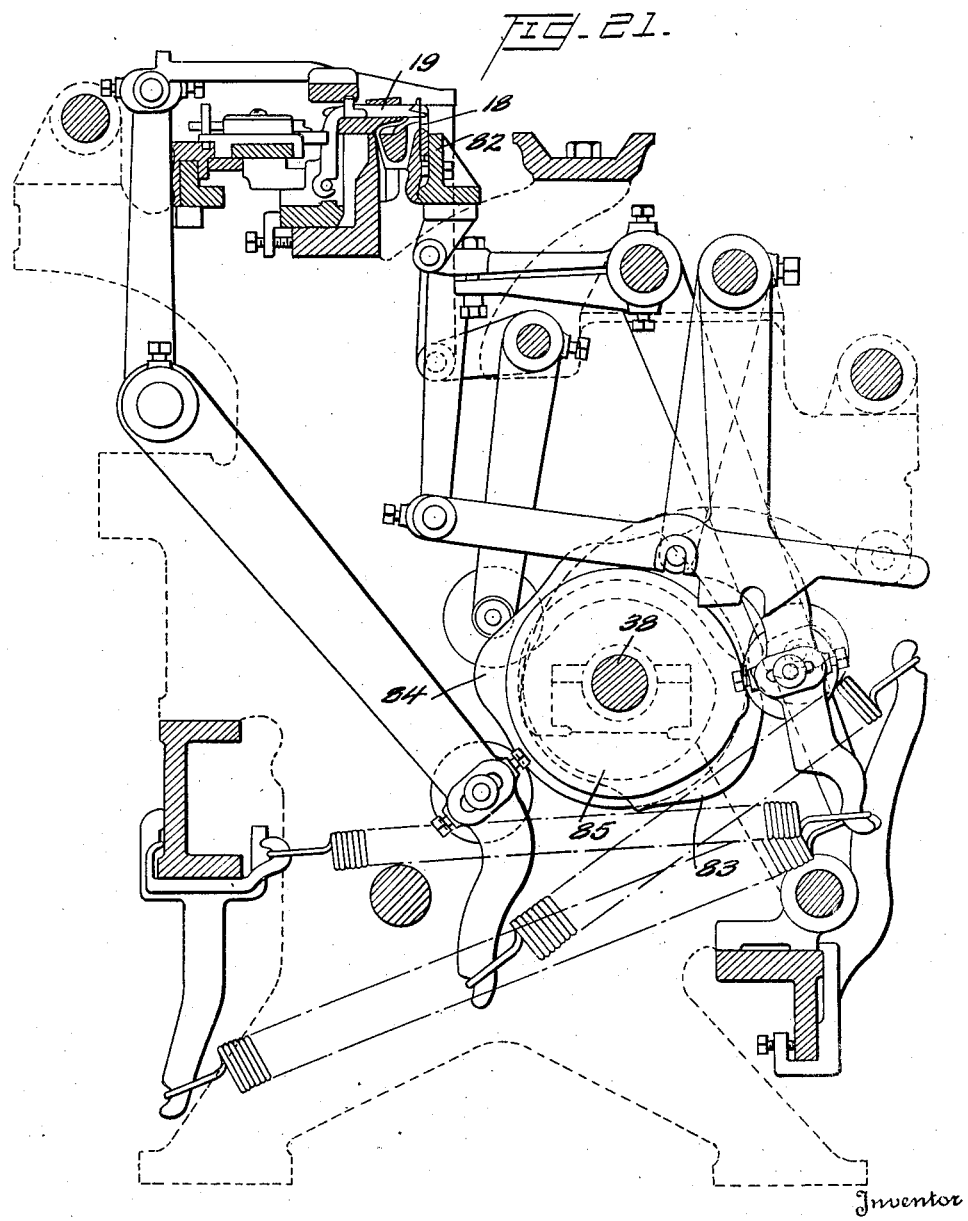
Fig. 21 is a view taken on a plane parallel to the planes of Figs. 13 and 14 and showing the mechanism for operating the needle bar.

Figs. 24, 25, and 26 are diagrams illustrating the movements of the needles and points.

Fig. 27 is a diagrammatic perspective view of the front of a machine showing certain parts whose operation will be later described.

Fig. 28 is a detail view of part of the mechanism appearing in Fig. 27.

Fig. 29 is another detail showing certain parts to better advantage than in Fig. 27.

Fig. 30 is a view of a stocking blank which may be knitted on the mechanism shown in this application.

Fig. 31 is a perspective view of the completed stocking.

Fig. 32 is a view on a greatly enlarged scale showing fragmentary sections of the fabric of the stocking blank.

Fig. 33 is another view on a greatly enlarged scale showing the fabric as it appears after being removed from the knitting machine, in contrast with a conventional showing.

The fabric to which my invention refers is of the so-called "full-fashioned" type well known in the art, and which may be made by the well-known Reading machine or by any other suitable type of machine. My novel fabric may be made on a Reading machine, and merely for the sake of convenience, the drawings illustrate changes which may be made in such machine in order to practice the invention. Other parts of the machine which are well known to those skilled in the art, and which are not necessary to an understanding of the invention, have been omitted for the sake of simplicity.

The fabric constructed according to my invention is one in which it is substantially impossible for a so-called "run" to take place or in which such a run can be limited, depending upon the specific arrangement of stitches.

Referring first to Fig. 1, I have shown therein one form of stitch which will prevent formation of a run in a knitted fabric, particularly of the full-fashioned type, although it is to be understood that the same stitch may be used with other types of knitted fabric. In this figure, I have shown a fragment of knitted fabric comprising a series of courses and wales, with each course formed of alternate needle and sinker loops. The courses designated 1, 2, and 3 are plain courses which may be formed in any usual way, and which are shown in this figure by way of contrast with the other courses to be described.

It will be seen that in the course designated 4, each alternate loop towards the upper part of the figure, and which in fact is a needle loop, is extended upwardly and to the right into the course designated 5 and used as a needle loop in that course. For example, the loop designated 6 is formed with the thread 7 and would ordinarily, in the prior art, form a needle loop in the course designated 4. It is, however, carried into the course designated 5 and displaced transversely in that course so as to form part of an adjacent wale and an additional needle loop in the course 5. Its bight or a portion thereof, being laterally displaced or shifted, overlaps with the loop 8 and forms a lock stitch at this point. Assuming that the loop 9 in the next course 10 should break, then the run will at once stop because the loop 6 is offset into an adjacent wale and locked in place there, so that it cannot be released as would be necessary to continue the run.

In the course designated 5, the loops, such as the loop 6, are shown as displaced towards the right, thus changing from one wale to an adjacent wale, whereas in the course designated 11 similar locking loops are shown as being displaced to the left, and then in the course designated 12 the locking loops are again shown as being displaced towards the right. Intermediate the locking zones may be one or more plain courses as desired. As a matter of fact, a short run of one or two courses may not be found undesirable, and therefore the question as to how many courses shall be made with the locking stitches is one largely of choice. For example, in Fig. 1 I have shown a single plain course 10 and a plain course 13, with the two courses 11 and 14 therebetween. These two courses 11 and 14 together form what may be termed a locking zone, and for the best results it is preferable not to have more than one plain course between any two locking zones, although, as just pointed out, this arrangement may be varied as found desirable.

It will also be seen that in the displacing of the loops, such as the loops 6 of Fig. 1, the thread forming these loops passes first under the sinker loops of the course 5, this course 5 being a course of normal loops, and then is deposited upon the thread forming such normal loops in this course. That is to say, the thread forming the displaced loop is passed under a portion of a thread in a course of normal loops and then over another portion of the threads in the same course.

In Fig. 2 I have shown a similar arrangement in which there are provided plain courses 15 separated by courses 16 and 17, which together form a locking zone, this being very much like the arrangement shown in Fig. 1, except that here the displacement of the locking loops is all in one direction. The term "normal" is herein employed to indicate loops of the plain courses as well as other loops which are not laterally displaced or shifted as herein described.

While I have shown the locking loops as comprising every other loop in a single course, it is possible to use every loop in a course as a locking loop or to have, say, every third or fourth loop as a locking loop. Similarly, the number of loops in a course which are used as locking loops and the number of plain courses between the locking zones may be varied both for economy and to aid in making different designs of fabric. It will be seen that in no wale is there a continuous line of loops, but that there are loops at appropriate intervals that are offset into adjacent wales and locked there, thus positively preventing a run in the wale from which the loop is offset.

Referring now more particularly to Figs. 3 to 10, inclusive, I will describe the sequence of steps which takes place in forming the fabric described above, and in considering these figures, reference will also be had to Figs. 11, 12, 24, 25 and 26. In Figs. 24, 25 and 26, the various numerals designate points corresponding to Figs. 3 to 10, inclusive, and indicate the positions of the needle and point in each of these figures. Fig. 25 shows the position of a certain point cooperating with the needle whose movement is indicated in Fig. 24, both Figs. 24 and 25 showing the movement of the needle as viewed in the same plane as that in which Figs. 3 to 10 were taken, whereas Fig. 26 shows the movement of a point in a plane at right angles to the aforesaid plane. For example, the numeral 4 in Figs. 24, 25 and 26 indicates the position of the needle and point respectively in Fig. 4.

In Figs. 22 and 23 are shown cams which cause the movement of the point and needle according to the diagrams of Figs. 24 and 25. Fig. 22 is an enlarged diagram of the cam 37 appearing in Fig. 13. In Fig. 13 this cam is shown merely in a diagrammatic way without any attempt to indicate its exact form, whereas Fig. 22 is drawn to show more clearly the relations of the various parts of the cam to each other and to the corresponding parts of the cam operating the needle. Fig. 23 shows the cam 83 for operating the needle in a vertical plane corresponding to the planes indicated in Fig. 3. Legends have been placed on Figs. 22 and 23 indicating the portions of the cam periphery which are in action while the needle and point are in the positions in the various Figures 3 to 10, inclusive. It will not be necessary to repeat the subject matter of these legends herein.

In connection with the showing in Fig. 23 of the needle operating cam 83, the showing is enlarged and is more detailed than in the other figures. Said other figures merely indicate the cam diagrammatically.

The successive positions of the different elements used in forming the stitches and the successive positions of the various threads and the fabric are shown in Figs. 3 to 10, inclusive, wherein the numeral 18 designates a spring-beard needle adapted to catch a thread and pull it through a previously formed loop in a manner well known in the art. The needle shown is one of a row of needles mounted in a needle bar and reciprocated vertically and horizontally by mechanism which is known in the art and which is indicated in Fig. 21.

Associated with the needle are the usual sinker 19 and a divider 20 which are likewise operated by mechanism known in the art and shown in Fig. 21. Associated with the needles, dividers, and sinkers are grooved lock points, which are shown at 21 in the figures being discussed and the operating means for which is shown and will be described further in connection with Figs. 13 to 20, inclusive. For the present, it will suffice to say that the points are arranged to be reciprocated vertically, and horizontally in a plane at right angles to the plane of the drawings, the vertical reciprocation being on the arc of a circle, as will be more fully described later.

Assuming that the parts are in the position shown in Fig. 3, the knitted fabric is leaving the machine in the direction of the arrow and is designated 22. The last row of loops 23 is in position on the knocking-over bits 24 and a new course is being formed with the thread 25. at this stage this thread being formed of sinker loops 26 engaging the sinkers 19 and needle loops 26' engaging the needles 18. In the practice of my invention, the transfer of selected loops into adjacent wales occurs substantially simultaneously with the laying of the thread for the next succeeding course and while the thread for that succeeding course is being measured or formed into kinks or bends between the needles through the action of the sinkers and the dividers.

The needles 18 are now moved downwardly, as are also the points 21, and, as shown in Figs. 4 and 11, the beard 18' of the needle engages the new loop 26' to carry it down through a loop 23, in a manner well known in the art. At the same time, the point 21 is moving downwardly at a faster rate of speed than the needle, and receives the beard 18' in its groove as shown in Fig. 5, and the lower end 27 of the point 21 first forces the beard 18' against the shank of the needle and then engages within the loop 23 and pulls it tight as indicated in Fig. 6 and in dotted lines in Fig. 12. The needle bar at the same time is moved backwardly or away to the right as appearing in these figures, and thus helps in forming the loops as just described. The result is that the loop 23 is of a length such that it will extend into the next course of the fabric. The needle continues to move downwardly until it leaves the plane of the fabric as seen in Fig. 7, still carrying with it the thread forming the new loop, and it will be seen in Fig. 7 that the needle is clear of the point.

The point, however, is still in engagement with the bight of the loop 23, and at this stage it is given a movement transversely of the wales, so that at least a portion of the loop 23 with which the point is engaged will be moved bodily from one existent wale to an adjacent wale, preferably to the next adjacent wale, to the position shown in full lines in Fig. 12. The amount of displacement of a loop 23 by a point is sufficient to bring it into position to be engaged by an adjacent needle and preferably by the next adjacent needle. The operation then proceeds with the needles rising, and the displaced loop 23 will be engaged by an adjacent needle and will then occupy the position shown, for example, by loop 6 in Fig. 1. That is to say, it will be engaged by a new loop corresponding to the loop 9 shown in Fig. 1, and will form a lock loop or thread engaging the loop in the next course. Finally, the parts are returned to the position shown in Fig. 10, which correspond to those shown in Fig. 3, and the operation may be repeated as often as desired to get the correct number of lock stitches needed to prevent running or to form the desired pattern in the fabric.

It will also be noticed that the locking loops 23 are being placed in correct position to perform their locking function at the same time that the next course of loops is being formed from the thread 25. That is to say, a plain course of loops is being formed from the thread 25 simultaneously with the shifting of the locking loops 23.

Referring now to Figs. 13 to 20, inclusive, I have shown the points 21 as mounted on a bar 28, Fig. 15 indicating two such bars disposed adjacent each other for the purpose of knitting separate articles, it being understood that usually a number of articles, such as stockings, are manufactured on one machine at the same time.

A single control may conveniently be used for the parts of the machine forming my invention. As stated above, the points 21 are given a vertical reciprocating movement and a transverse reciprocating movement, and the means for giving the first-named movement will now be described, this means being best shown in Fig. 13.

The bar 28 is fastened to the shaft 29 upon an arm 30, which in turn is secured to a rock shaft 31 mounted in suitable bearings upon the frame of the machine, and this shaft 31 is rocked in order to give the vertical reciprocation of the points 21. The reciprocation is caused by a link 32 connected to the shaft 29 and pivoted at 33 to a rocking arm 34 pivoted at one end at 35 to the frame of the machine, and intermediate its ends carrying a roller 36 adapted to engage a cam 37 on the cam shaft 38. When in the position shown in Fig. 13, the roller engages the cam at its high point 39, which is concentric with the shaft 38 so that passage of the part 39 will not cause actuation of the arm 34. Means to be presently described is provided for releasing the arm 34 so that it may be operated by the cam 37.

Referring now to Figs. 14, 15, and 16, the transverse movement of the points 21 is caused by means of a pattern wheel 40 which may be in the form of a wheel rotating on a shaft 41, and having cam faces on opposite sides thereof cooperating with rollers 42 on a guide 43 slidably mounted on the shaft 29. The guide 43 is provided with ears 44 engaging collars 45 fastened on a shaft 46 slidably mounted for longitudinal movement on the frame of the machine. Secured rigidly to the shaft 46, as by brackets 47, are the bars 28 in which the points are mounted so that movement of the guide 43 along the shaft 29 causes movement of the points 21 an equal amount.

The wheel 40 is rotated intermittently as by a pawl and ratchet arrangement, here shown as comprising a ratchet 48 secured to the shaft 41 so as to rotate with the wheel and operated by a pawl 49 pivoted at 50 to an arm 51 of a bell crank lever secured on a rock shaft 52. The other arm 53 of the lever has at its end a roller 54 engaging a cam 55 on the cam shaft 38. The cam 55 is adapted to intermittently rock the bell crank lever and thus operate the pawl and rotate the ratchet and, consequently, the wheel 40. The pawl is held in yielding engagement with the ratchet as by a spring 56.

When forming plain courses of fabric, the cams 37 and 55 should be inoperative, and, as pointed out above, the roller 36 is held inoperative upon rotation of the cam 37, this being done by a latch 57 engaging a pin 58 on the arm 34. The latch 57 is mounted upon a rock shaft 59 upon which is also secured an arm 60 carrying on its end a roller 61 adapted to engage a cam 62 upon the cam shaft 38. The roller 61 is, however, slidably mounted upon its shaft 61' which is carried on the end of the arm 60, and, similarly, the roller 54 is slidably mounted on its shaft 54'. These rollers 54 and 61 may be moved on their shafts 54' and 61' to a position where they do not engage the cams 55 and 62, respectively, and then means is provided for simultaneously moving them into engagement with those cams.

In Fig. 14 I have shown a forked lever 63 engaging the roller 54 and pivoted on the arm 53 as at 64. Similarly, the roller 61 is engaged by a forked lever 65 pivoted at 66 on the arm 60. Secured to the opposite ends of the levers 63 and 65 is a rod 67 so that movement of this rod 67 will operate both rollers 54 and 61 to bring them into operative relation to the cams 55 and 62, or out of engagement therewith.

The rod 67 may be thus operated by the means shown in Fig. 20, which comprises a rock shaft 68 supported in suitable brackets 69 on the frame of the machine and carrying an arm 70 pivoted to the rod 67. The other end of the rock shaft may carry an arm 71 pivoted to a link 72 which is in turn pivoted to a bell crank lever 73 having at its end a nose 74 disposed in position to be engaged by buttons 75 upon a chain 76 which may be driven by a sprocket 77, which in turn is operated by suitable connections from the cam shaft 38. The buttons are so arranged that the operation of the rod 67 and, consequently, of the cams 55 and 62, will cause movement of the points 21 in synchronism with the needle bar to perform the operations described above.

The wheel 40 forms a pattern wheel which may be varied to obtain any desired arrangement of lock stitches or loops in the knitted fabric, and the buttons 75 on the chain may be varied to control the number of locking zones used in the fabric. The arrangement is thus a very flexible one, as the pattern wheel may be changed at will and the buttons 75 may be made replaceable, as well known in the art. For the sake of convenience, the chain 76 may be the usual narrowing chain employed in machines of this type, and the buttons 75 are in addition to the buttons normally used in the narrowing operation.

The wheel 40 may be easily changed by making it of segments as indicated in Fig. 16, and by holding the segments in place as by pins 78 passing through the ratchet 48 on one side. For help in assembling, and also as a safety provision in operation, I provide on the opposite sides of the wheel 40 a second ratchet 79 engaging a pawl 80 urged into engagement with teeth on the ratchet as by a spring 81. This is a two-way ratchet used to prevent overrunning and also helps to hold the segments of the wheel in place.

Referring now to Fig. 21, I have indicated therein a means for operating the needle bar, sinkers, and dividers. This mechanism will not be described in detail, as it generally follows the usual mechanism for operating these elements in a machine of the Reading type. The needles 18 are mounted in the usual needle bar 82, and the needle bar, sinkers, and dividers are all operated from the cam shaft 38 by the cams 83, 84, and 85. The cams in my machine are varied from the cams ordinarily employed in this type of machine, in order to vary the timing of the needle bar, sinkers, and dividers, but otherwise the connections are closely similar to those usually employed, and therefore a detailed description will not be indulged in.

Referring now to Figs. 27, 28, and 29, I have shown particularly in Fig. 27 parts previously described in relation to certain other parts of the machine, especially to the narrowing mechanism. The usual narrowing points are indicated at 86, but these points are not used in the operation of narrowing a stocking blank when using my invention. Instead of using the narrowing points, the travel of the thread carrier is varied and in the various locking zones the displaced loops which occur at the end of the thread carrier movement will form an edge portion of the fabric of such character that it may be used in forming a seam, without the provision of any special selvage. In other words, the fact that the body of the stocking blank is of substantially non-run character throughout makes it possible to place the edge of the fabric anywhere that it is desired to have it, and all that is necessary is to limit the travel of the thread carrier.

In Fig. 32 is shown a section of the fabric forming the blank of Fig. 30. This blank, which is designated 87, has edges 88 and 89, the fabric adjacent the edge 88 being shown on an enlarged scale in Fig. 32, in which, however, the position of the fabric is reversed from that in Fig. 30 to show the fabric as it comes from the machine. The character of the fabric shown in Fig. 32 is the same as that appearing in Figs. 1, 2, 11, and 12, and more particularly has been drawn like that appearing in Fig. 1. I will assume that the displaced loops are those designated 23 in Figs. 11 and 12, although some are shown displaced in one direction and some in the other.

Assuming that the blank is of full width at the locking zone formed of the two courses 90 and 91 and that the thread carrier has formed the course 91 while traveling towards the right of Fig. 32, then on its return travel it will lay the thread in the plain course 92, traveling towards the left of this figure. Then it will return, laying the course 93, the travel of the thread carrier being buried so that the thread will not catch the needle loops 94 in the course 92, which are thus left loose or dropped. Similarly, other loose or dropped loops 95 may be left at the selected intervals along the edge of the blank, either singly or in groups of two or more. A similar arrangement is used on the other edge 89 of the fabric, as will be understood. This blank and the novel features just described are more particularly described and are claimed in my copending application Serial No. 607,027, filed April 23, 1932.

There are sufficient of the locking loops 23 in each wale so that the edge of the fabric is maintained firm enough to be used in forming a seam, and therefore it is possible to knit an entire stocking, for example, of this type of fabric. For practical reasons, however, it is desirable sometimes to make the foot of ordinary knitted fabric formed of plain loops, and therefore I prefer to retain in my machine the narrowing points and to so arrange the parts that these points may be used for knitting on the foot.

Briefly, what I prefer to do is to make the leg of the blank 87 of my new fabric down to the commencement 96 of the heel tabs 97. I then continue knitting, making the top or instep 98 of the foot of the same kind of fabric as the leg, but making the heel tabs 97 with plain loops or, in other words, of ordinary knitted fabric. Similarly, the foot 99 is also knit of ordinary fabric, and during the operating of knitting the heel tabs and foot, the narrowing points may be used in the ordinary manner.

The above illustrates one of the important features of my mechanism and method, which is that it is very flexible and may be quickly changed to make either a non-run fabric or the ordinary type of fabric, whichever is desired.

Referring again more particularly to Figs. 27, 28, and 29, I have shown therein the usual cam shaft 38 having thereon the cams previously described and which are indicated by like numerals in this figure. For example, the needles 18 are operated by means of the cams 83 and 84, although part of the operating mechanism, particularly that operated by the cam 84, has been omitted for the sake of clearness of illustration of other parts.

In machines of this type, it is common to have thread carrier bars 100. The motion of these bars is caused by the Coulier motion well known in the art and which, therefore, 1,882,514

It is of course to be operated by buttons 133 on the trip lever is shown as being operated in the usual manner, this lever motion is operated by the cam shaft pivot 132, although in accordance with the other bars 101, it convenient to mount the pivot 140. For the thread carrier 101, the pivot 140, in illustration, however arate pivots.

Upon one of the arate pivots.

The motion of the thread carrier is limited by stops mounting means has been threaded on a screw frame in any suitable manner. figure to avoid confusion. When the machine has a pawl 107. In Fig. 27, fabric, the pawl 102 is held out of engagement with the ratchet by the chain 76 may be engaged by the roller 122 above, and the roller 122 is engaged by the cam 114 in Fig. 27, the roller 122 lever 132, the roller 122 which, as will be clear from the illustration, is in the direction of movement of the blank.

The motion of this pawl and ratchet will engage narrowing is necessary blank.

this pawl and ratchet will engage narrowing is necessary against threaded spindle 111 adapted to each nut 108 is a bar 113 carrying narrowing points 86.

In provided on likewise to be operated by a pawl 112.

The travel of the carrier bars is usually operated this spindle 110 and 112 to simultaneously turn the ratchet wheels 109 and 110 which will, in turn, carrying narrowing of the nuts 103 and 112 to simultaneously the re- spring controlled 107 and 110 which will engage against and longitudinal movement of the spindles to the re- spring pawls 105 and 112 simultaneously the re- spring controlled 107 and 110 which will engage it en- lengthwise of the spindles to the ar- after indicated by the ar- after that the other bars 103 threaded on a spindle 106 which formed on a ratchet 107. In Fig. 27, adjacent nuts 103, it being machines for making a bank are operated in common shaft and from common screws. I shall limit my description to one of these machines so far as practical.

In the narrowing machine, there are also threaded wing nuts 108, which are on a spindle 110, and secured thereto a ratchet wheel 109 on a spindle 110, and Secure the narrowing points 86.

cured a trip 141 disposed in position to be engaged by buttons 142 on the chain 76. As these buttons operate the trip, the detent 139 is removed from the position shown, and the spring 143 will then move the shaft 137 towards the shaft 38 until the roller 136 comes in a position to be engaged by the cam 135. This cam is circular in form and concentric with the shaft 38, and has spaced ends 144 and 145 between which the roller 136 may move into position to be engaged by the cam.

Spaced along the shaft 38 from the cam 135 is a cam 146 having a portion 147 disposed so as to substantially contact with the roller 136 when the roller is in the position shown in Fig. 28. When the roller 136 is moved inwardly towards the shaft 38 as described above, to engage the cam 135, it rides inside the cam 146 or, in other words, nearer to the shaft 38 than is the cam 146.

Upon tripping of the detent 139, the roller 136 is brought into engagement with the cam 135 as described above, and the entire shaft 38 with associated cams will be moved towards the right of Fig. 27, this movement bringing the roller 136 within the cam 146 or nearer the shaft than the cam surface. As the cam shaft rotates, a nose 148 rigidly secured to the cam 135 will come into engagement with a roller 149 secured to the shaft 137 and thus force the shaft 137 and the roller 136 outwardly away from the cam shaft 38 to a position where the detent 139 will again operate to hold the roller 136 out of engagement with the cam 135 against the action of the spring 143. Since the cam shaft 38 has been shifted towards the right from the positions shown in Figs. 27 and 28, the roller 136 will now be in substantial engagement with the portion 150 of the cam 146, and as this cam rotates with the cam shaft, the roller 136 will cause shifting of the cam shaft back towards the left of Fig. 27 until it reaches the position now shown in that figure.

The shifting of the cam shaft 38 towards the right of Fig. 27 will bring the cam 115 into position to be engaged by the roller 122, and thus the arm 121 will be rocked to operate both ratchets 106 and 111 which, in turn, will actuate both the narrowing nuts and the carrier nuts. In other words, the narrowing operation will be performed in the manner common in knitting plain fabric prior to my invention.

In Fig. 33$^a$ I have shown a fragmentary view of a piece of fabric in which the locking zones are more closely spaced than in Figs. 1 and 2. In this fabric, it will be seen that every other course has loops therefrom displaced into an adjacent course so that one locking zone follows another closely.

In Fig. 33$^b$ is shown a reproduction from a photograph of a fabric as it actually appears under a microscope when constructed in accordance with what is shown in Fig. 33$^a$. It is of course to be understood that in Figs. 1, 2, 11, and 12 I have shown the loops in a conventional way commonly used in the art and which shows the relation of the various loops to each other while the fabric is being knit on the machine. It is well known in the art that after a fabric leaves the machine, the loops will mutually adapt or accommodate themselves and cause the fabric to have a superficially different appearance.

Comparing Figs. 33$^a$ and 33$^b$, the locking or displaced loops are designated 152, and the needle loops 153, because of the displacement of the loops 152, have pulled downwardly in their respective wales until each loop 153 is only a short distance above the next needle loop 154 in the same wale. Similarly and for the same reason, each needle loop 155 has its bight opened and one side 155 thereof pulled over and downwardly by the loop 153. The displaced loop 152 in Fig. 33$^b$ is still disposed above the side 157 of the needle loop 158 which, in Fig. 33$^a$, is covered by the displaced loop 152, but in Fig. 33$^b$ the bight of this loop 158 has moved horizontally out from under the bight of the loop 152. Such displacements are, of course, expected in practice, but it is evident that the desirable properties of the fabric are maintained after the fabric has been removed from the machine. Moreover, it will be seen that the loops 153 form the course from which the loops 152 are displaced, three successive courses being designated by the loops 154, 153, and 158.

While I have shown and described a selected method and specific mechanism for practicing my invention, it is of course to be understood that various changes in both method and mechanism may be made, without departing from the scope of the invention, and therefore I do not intend to limit myself except by the appended claims.

I claim:

1. The method of knitting a fabric which comprises forming successive courses and wales of loops, and displacing selected loops, each loop being displaced from a wale in the body of the fabric into an adjacent wale while simultaneously moving the thread for a succeeding course of loops.

2. The method of knitting a fabric which comprises forming successive courses and wales of loops, and displacing selected loops by locking points from one course into an adjacent course while simultaneously moving the thread for a succeeding course of loops into said course.

3. The method of knitting a fabric which comprises forming locking loops and during the formation thereof forming a succeeding course of plain loops.

4. The method of knitting a fabric which comprises forming loops in a course consisting of alternate sinker and needle loops, with needles in said needle loops, inserting locking points into selected ones of said needle loops and displacing said selected loops into the position to be occupied by a succeeding course while the needles are still within the loops in said first-named course.

5. The method of knitting a fabric which comprises forming loops in a course consisting of alternate sinker and needle loops, with needles in said needle loops, inserting locking points into selected ones of said needle loops and displacing said selected loops into the position to be occupied by a succeeding course while the needles are still within the loops in said first-named course and while said needles are forming loops in said succeeding course.

6. The method of knitting a fabric which comprises forming loops in a course consisting of alternate sinker and needle loops, with needles in said needle loops, inserting locking points into selected ones of said needle loops and displacing said selected loops into the position to be occupied by a succeeding course and into an adjacent wale while the needles are still within the loops in said first-named course.

7. The method of knitting a fabric which comprises forming loops in a course consisting of alternate sinker and needle loops, with needles in said needle loops, inserting locking points into selected ones of said needle loops and displacing said selected loops into the position to be occupied by a succeeding course and into an adjacent wale while the needles are still within the loops in said first-named course and while said needles are forming loops in said succeeding course.

8. The method of knitting a fabric which comprises forming loops in a course consisting of alternate sinker and needle loops, with needles in said needle loops, inserting locking points into selected ones of said needles loops, displacing said selected loops into the position to be occupied by a succeeding course while the needles are still within the loops in said first-named course, and depositing bight portions of said displaced loops upon the loops of said succeeding course.

9. The method of knitting a fabric which comprises forming loops in a course consisting of alternate sinker and needle loops, with needles in said needle loops, inserting locking points into selected ones of said needle loops, displacing said selected loops into the position to be occupied by a succeeding course while the needles are still within the loops in said first-named course and while said needles are forming loops in said succeeding course, and depositing bight portions of said displaced loops upon the loops of said succeeding course.

10. The method of knitting a fabric which comprises forming loops in a course consisting of alternate sinker and needle loops, with needles in said needle loops, laying thread for a succeeding course of alternate sinker and needle loops above said first-named course, inserting locking points into selected ones of said needle loops and displacing said selected loops into the position to be occupied by said succeeding course while moving the needles to bring said thread through the loops of said first-named course and beneath the thread of said displaced loops.

11. The method of knitting a fabric which comprises forming loops in a course consisting of alternate sinker and needle loops, with needles in said needle loops, laying thread for a succeeding course of alternate sinker and needle loops above said first-named course, inserting locking points into selected ones of said needle loops and displacing said selected loops into the position to be occupied by said succeeding course and into an adjacent wale while moving the needle to bring said thread through the loops of said first-named course and beneath the thread of said displaced loops.

12. In a knitting machine of the class described, means for forming successive courses and wales of loops, and means for displacing bight portions of selected loops from one wale into another wale in the body of the fabric while simultaneously moving the thread for a succeeding course of loops into said course.

13. In a knitting machine of the class described, means for forming successive courses and wales of loops, and means for displacing bight portions of selected loops from one course into another course in the body of the fabric while simultaneously moving the thread for a succeeding course of loops into said course.

14. In a knitting machine of the class described, means for forming successive courses and wales of loops, and means for displacing bight portions of selected loops from one course into another course and into another wale in the body of the fabric while simultaneously moving the thread for a succeeding course of loops into said course.

15. In a knitting machine of the class described, a needle bar having thereon a row of needles, sinkers and dividers associated with said needles, means to operate said needles, sinkers and dividers, a row of locking points parallel with said row of needles, means to operate said points in synchronism with said needles, sinkers and dividers to transfer selected loops into adjacent wales and adjacent courses of the fabric, and means to simultaneously move the thread for a new course of loops into said course.

16. In a knitting machine of the class described, a needle bar having thereon a row of needles, sinkers and dividers associated with said needles, means to operate said needles, sinkers and dividers, a row of locking points parallel with said row of needles, means to operate said points in synchronism with said needles, sinkers and dividers to transfer selected loops into adjacent wales and adjacent courses of the fabric, and means to simultaneously move the thread for a new course of loops into said course, with the thread of the new course beneath that of the displaced loops.

17. In a knitting machine of the class described, a row of needles, a set of narrowing points adapted to cooperate with certain of said needles adjacent the end of said row, a set of locking points adapted to cooperate with substantially all of the remaining needles to transfer selected loops from courses in the fabric into adjacent courses and adjacent wales, means to operate either of said sets independently of the other, a carrier to lay thread in position to be operated upon by said needles and points, means to vary the length of travel of said carrier, and automatic means to put in operation said means to vary the length of travel of the carrier or to put in operation said means to operate said narrowing points.

18. The method of knitting a fabric which comprises forming loops in a course consisting of alternate sinker and needle loops, inserting locking points into selected ones of said needle loops and displacing said selected loops into a succeeding course and into an adjacent wale of the fabric while the thread for the loops in said succeeding course is being moved into said succeeding course.

19. In a knitting machine of the class described, a needle bar having thereon a row of needles, sinkers and dividers associated with said needles, means to operate said needles, sinkers and dividers, a row of locking points parallel with said row of needles, means to operate said points in synchronism with said needles, sinkers and dividers to transfer selected loops and means to simultaneously lay the thread for a new course of loops.

20. In a knitting machine of the class described, a needle bar having thereon a row of needles, sinkers and dividers associated with said needles, means to operate said needles, sinkers and dividers, a row of locking points parallel with said row of needles, means to operate said points in synchronism with said needles, sinkers and dividers to transfer selected loops into adjacent wale lines of the fabric, and means to lay the thread for a new course of loops simultaneously with such transfer of selected loops.

21. In a knitting machine of the class described, means for forming a first course of loops, means for forming a second course of loops, means for laying the thread of a third course of loops and means for moving said thread into said third course while displacing selected loops from the second course into the third course.

22. In a knitting machine of the class described, means for forming a first course of loops, means for forming a second course of loops, means for laying the thread for a third course of loops and means for moving said thread into said third course while displacing selected loops from the second course into the third course, and means for laying a fourth course of loops in engagement with the loops of the third course and with said loops that are displaced from the second course.

23. In a knitting machine of the class described, a needle bar having thereon a row of needles, sinkers and dividers associated with said needles, means to operate said needles, sinkers and dividers, a row of locking points parallel with said row of needles, means to reciprocate said points generally parallel with said row of needles to transfer selected loops from courses in the fabric into adjacent courses and adjacent wales, said means comprising a rotatable pattern wheel provided with cam surfaces on both sides thereof, a cam follower engaging said surfaces, a bar supporting said row of points, and a connection between said follower and said bar.

24. In a knitting machine of the class described, a needle bar having thereon a row of needles, sinkers and dividers associated with said needles, means to operate said needles, sinkers and dividers, a row of locking points parallel with said row of needles, means to reciprocate said points generally parallel with said row of needles to transfer selected loops from courses in the fabric into adjacent courses and adjacent wales, said means comprising a rotatable pattern wheel provided with cam surfaces on both sides thereof, a cam follower engaging said surfaces, a bar supporting said row of points, and a connection between said follower and said bar, said wheel being formed in segments of differing surfaces to thereby make it possible to vary the form of said cam surface by changing said sections.

25. That method of knitting a fabric upon spring beard needles, which includes, laying a course of thread upon the needles, causing the needle cooperating instrumentalities to function in forming loops of the thread of that course which is still upon the needles, laying the next course of thread upon the said needles, and during the laying of said next course of thread causing thread engaging instrumentalities to enter a series of loops of said first mentioned course while still upon their needles under the said next course of thread, and then to shift or displace said so-entered loops onto adjacent needles over the loops of the said next course, whereby a course of normal loops and a locking course are formed.

26. That method of knitting a non-run fabric upon a full-fashioned spring beard needle knitting machine provided with spring beard needles, dividers and sinkers, and also provided with locking points to enter loops while upon the needles, which comprises the following steps: laying without time interruption a series of courses of needle and sinker loops, and during the laying of a predetermined course causing said locking points to enter selected loops of the preceding course while still upon their needles, and displacing by said locking points the said selected loops into the course of loops being laid, thereby making a locking zone transversely of the fabric, and repeating said locking zone persistently throughout the fabric.

27. That method of knitting a non-run fabric upon a full-fashioned spring beard needle knitting machine provided with spring beard needles, dividers and sinkers, and also provided with locking points to enter loops while upon the needles, which comprises the following steps: laying without time interruption a series of courses of needle and sinker loops, and during the laying of a predetermined course causing said locking points to enter selected loops of the preceding course while still upon their needles, and displacing by said locking points bight portions of the said selected loops from their own wales, thereby making a locking zone transversely of the fabric.

28. In a full-fashioned knitting machine having a needle bar with a row of spring beard needles and having sinkers and dividers associated with said needles, a series of locking points in substantial parallelism with said row of needles, means to cause said needles, sinkers and dividers to function in loop formation continuously course after course, and means to operate said locking points during the positioning of the thread in courses, to cause them to transfer bight portions of selected loops.

29. In a full-fashioned knitting machine having a needle bar with a row of spring beard needles and having sinkers and dividers associated with said needles, a series of locking points in substantial parallelism with said row of needles, means to cause said needles, sinkers and dividers to function in loop formation continuously course after course, and means to operate said locking points during the positioning of the thread in courses, to cause them to transfer bight portions of selected loops into adjacent wales of the fabric.

30. In a full-fashioned knitting machine having a needle bar with a row of spring beard needles and having sinkers and dividers associated with said needles, a series of locking points in substantial parallelism with said row of needles, means to cause said needles, sinkers and dividers to function in loop formation continuously course after course, and means to operate said locking points during the positioning of the thread in courses, to cause them to transfer bight portions of selected loops into a subsequent course of the fabric and adjacent wales of such subsequent course.

31. In a full-fashioned knitting machine having a needle bar with a row of spring beard needles and having sinkers and dividers associated with said needles, a series of locking points in substantial parallelism with said row of needles, means to cause said needles, sinkers and dividers to function in loop formation continuously course after course, and means to operate said locking points during the laying of a course upon the needles to enter under the thread of said course into loops of the preceding course while still upon their needles and to transfer bight portions of said selected loops over the thread of said last laid course onto adjacent needles into superposed position upon loops previously laid on such needles.

32. In a knitting machine, means to form a course of plain loops, means to displace selected ones of said loops to a position to be occupied by the next following course, means to form said next following course of plain loops, and means causing said three first-named means to operate in the order named in predetermined time relation to each other.

33. In a knitting machine a needle bar having thereon a row of needles, sinkers and dividers associated with said needles, a row of locking points parallel with said needles, means actuated automatically during operation of the machine to move said points and said needles, sinkers and dividers in time relation to each other to lay successive courses of loops and to transfer selected loops in a course into adjacent wales and adjacent courses of the fabric, all of said means being continuously actuated to repeat the transfer of loops in courses at spaced intervals throughout the body of the fabric to render the fabric substantially non-run throughout.

34. The method of knitting a fabric which comprises forming successive courses and wales of loops and displacing selected loops, each loop being displaced from a wale in the body of the fabric into an adjacent wale while simultaneously sinking loops of a succeeding course of loops.

35. The method of knitting a fabric which comprises forming successive courses and wales of loops and displacing selected loops, each loop being displaced from a wale in the body of the fabric into an adjacent wale while simultaneously laying the thread for and sinking loops of a succeeding course of loops.

36. The method of knitting a fabric which comprises forming successive courses and wales of loops and displacing selected loops, each loop being displaced from a wale in the body of the fabric into an adjacent wale while simultaneously laying the thread and measuring the loops of a succeeding course.

37. The method of knitting a fabric which comprises forming successive courses and wales of loops and displacing selected loops, each loop being displaced from a wale in the body of the fabric into an adjacent wale while simultaneously laying the thread for a succeeding course of loops and while causing the sinkers and dividers to act upon said thread to kink the thread about the needles.

38. The method of knitting a fabric which comprises forming successive courses and wales of loops and displacing selected loops, each loop being displaced from a wale in the body of the fabric into an adjacent wale while simultaneously laying the thread for a succeeding course of loops and while sinking and dividing the loops of that course.

39. In a knitting machine a needle bar having thereon a row of needles, sinkers and dividers associated with said needles, a row of locking points parallel with said needles, means actuated automatically during operation of the machine to move said points and said needles, sinkers and dividers in time relation to each other to lay successive courses of loops and to transfer selected loops in a course into adjacent wales and adjacent courses of the fabric, all of said means being continuously actuated to repeat the transfer of loops in courses at spaced intervals throughout the body of the fabric to render the fabric substantially non-run throughout, and means on the same machine for selectively changing the operation thereof to form a fabric with regular courses of wales and loops in which fabric all of the said loops are of substantially the same form and in which each loop bears substantially the same relation to adjacent loops throughout the body of the fabric.

ALFRED GRAENZ.